(12) United States Patent
Kalogeropulos

(10) Patent No.: US 6,948,162 B2
(45) Date of Patent: Sep. 20, 2005

(54) ENHANCED PARALLELISM IN TRACE SCHEDULING BY USING RENAMING

(75) Inventor: Spiros Kalogeropulos, Los Gatos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 632 days.

(21) Appl. No.: 10/043,772

(22) Filed: Jan. 9, 2002

(65) Prior Publication Data

US 2003/0131346 A1 Jul. 10, 2003

(51) Int. Cl.⁷ .................................................. G06F 9/45
(52) U.S. Cl. ....................... 717/159; 717/154; 717/140; 717/128
(58) Field of Search ................................ 717/154, 161, 717/159, 141, 146, 151, 156, 158, 160, 128, 140; 712/217, 234, 241, 23, 216

(56) References Cited

U.S. PATENT DOCUMENTS

| | | | | | |
|---|---|---|---|---|---|
| 5,828,886 | A | * | 10/1998 | Hayashi ...................... 717/159 |
| 5,867,711 | A | * | 2/1999 | Subramanian et al. ...... 717/161 |
| 6,076,159 | A | * | 6/2000 | Fleck et al. .................. 712/241 |
| 6,449,713 | B1 | * | 9/2002 | Emer et al. .................. 712/234 |
| 6,526,572 | B1 | * | 2/2003 | Brauch et al. .............. 717/154 |
| 6,651,164 | B1 | * | 11/2003 | Soltis et al. ................ 712/217 |
| 2003/0079211 | A1 | * | 4/2003 | Lueh .......................... 717/154 |

OTHER PUBLICATIONS

P. Geoffrey Lowney et al., *The Multiflow Trace Scheduling Compiler*, The Journal of Supercomputing, 7, 51–142 (1993).

* cited by examiner

*Primary Examiner*—Tuan Dam
*Assistant Examiner*—Chih-Ching Chow
(74) *Attorney, Agent, or Firm*—Gunnison, McKay & Hodgson, L.L.P.; Serge J. Hodgson

(57) ABSTRACT

A method includes scheduling instructions within a trace disregarding data dependencies from off trace basic blocks. After scheduling, errors caused by instruction movement are corrected. By disregarding data dependencies from off trace basic blocks, more parallelism is exposed resulting in more instruction motion. In this manner, efficiency is maximized.

32 Claims, 8 Drawing Sheets

ENHANCED PARALLELISM IN TRACE SCHEDULING BY USING RENAMING

BACKGROUND OF THE INVENTION

1. Field of the Invention

The present invention relates generally to compilers. More particularly, the present invention relates to a trace scheduler for a compiler.

2. Description of the Related Art

Processors rely on the compiler to produce an instruction schedule which extracts and exploits the available instruction level parallelism in a routine to maximize the instruction issue rate and the parallelism of memory operations by issuing prefetches and loads as early as possible.

The process of detecting and scheduling the available instruction level parallelism is usually applied on the control flow graph of a routine, where nodes on the graph are called basic blocks. A basic block is a sequence of consecutive instructions with a single entry and a single exit.

Instruction schedulers use single basic blocks for detecting and scheduling the available instruction level parallelism. However, single basic blocks often contained insufficient instruction level parallelism. Therefore higher performance is achieved by exploiting instruction level parallelism from consecutive basic blocks.

In trace scheduling, a trace scheduler schedules instructions within a trace, which is a sequence of basic blocks having an execution frequency greater than a predetermined execution frequency. By scheduling instructions within a trace, instructions are moved between basic blocks to increase efficiency. However, due to data dependencies, certain instructions cannot be moved.

To illustrate, FIG. 1 is a control flow graph 100 including a trace 110 in accordance with the prior art. Control flow graph 100 includes basic blocks 102, 104, 106 and 108. As indicated by the arrows, the control flow of control flow graph 100 is from basic block 102 to basic block 108 through either basic block 104 or basic block 106.

Control flow graph 100 includes trace 110, which consists of basic blocks 102, 104 and 108. Trace 110 does not include basic block 106 and so basic block 106 is referred to as an off trace basic block 106.

Basic block 102 includes an instruction 112, which loads the value from memory location Mem0 into register r4. However, since a few clock cycles must pass before the value from memory location Mem0 is available in register r4 after executing instruction 112, the processor sits idle unless other instructions are scheduled immediately following instruction 112.

Accordingly, the instruction scheduler attempts to schedule instructions within basic block 102 immediately following instruction 112 to maximize efficiency. However, in this example, there are insufficient instructions within basic block 102 to schedule any additional instructions following instruction 112.

In an attempt to prevent the processor from sitting idle following instruction 112, a trace scheduler attempts to schedule instructions within trace 110, i.e., within basic blocks 102, 104 and 108, immediately following instruction 112 to maximize efficiency.

As shown in FIG. 1, basic block 108 includes instructions 114, 116, and 118. The trace scheduler attempts to move instructions 114, 116, and/or 118 to basic block 102 following instruction 112. However, instruction 114 loads the value from memory location Mem1 into register r2. Since instruction 120 in off trace basic block 106 stores the value of register r1 in memory location Mem1, instruction 114 must follow instruction 120. Otherwise, the wrong value will be loaded in register r2 in instruction 114.

Accordingly, instruction 114 cannot be moved by the trace scheduler to basic block 102. More particular, instruction 114 is not moved by the trace scheduler to prevent the wrong value from being loaded into register r2. As should be readily apparent, this decreases the efficiency of the compiler.

SUMMARY OF THE INVENTION

According to one embodiment of the present invention, a method includes scheduling instructions within a trace disregarding data dependencies from off trace basic blocks. After scheduling, errors caused by instruction movement are corrected.

By disregarding data dependencies from off trace basic blocks, more parallelism is exposed resulting in more instruction motion. In this manner, efficiency is maximized.

In one particular embodiment, a method includes:

building a trace having instructions;

building a trace block having the instructions;

scheduling the instructions within the trace block disregarding data dependencies from any off trace basic blocks, wherein at least one of the instructions is moved during the scheduling; and correcting errors due to the at least one of the instructions being moved.

The present invention is best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

According to one embodiment of the present invention, a method includes scheduling instructions within a trace disregarding data dependencies from off trace basic blocks. After scheduling, errors caused by instruction movement are corrected.

By disregarding data dependencies from off trace basic blocks, more parallelism is exposed resulting in more instruction motion. In this manner, efficiency is maximized.

Figure 1:
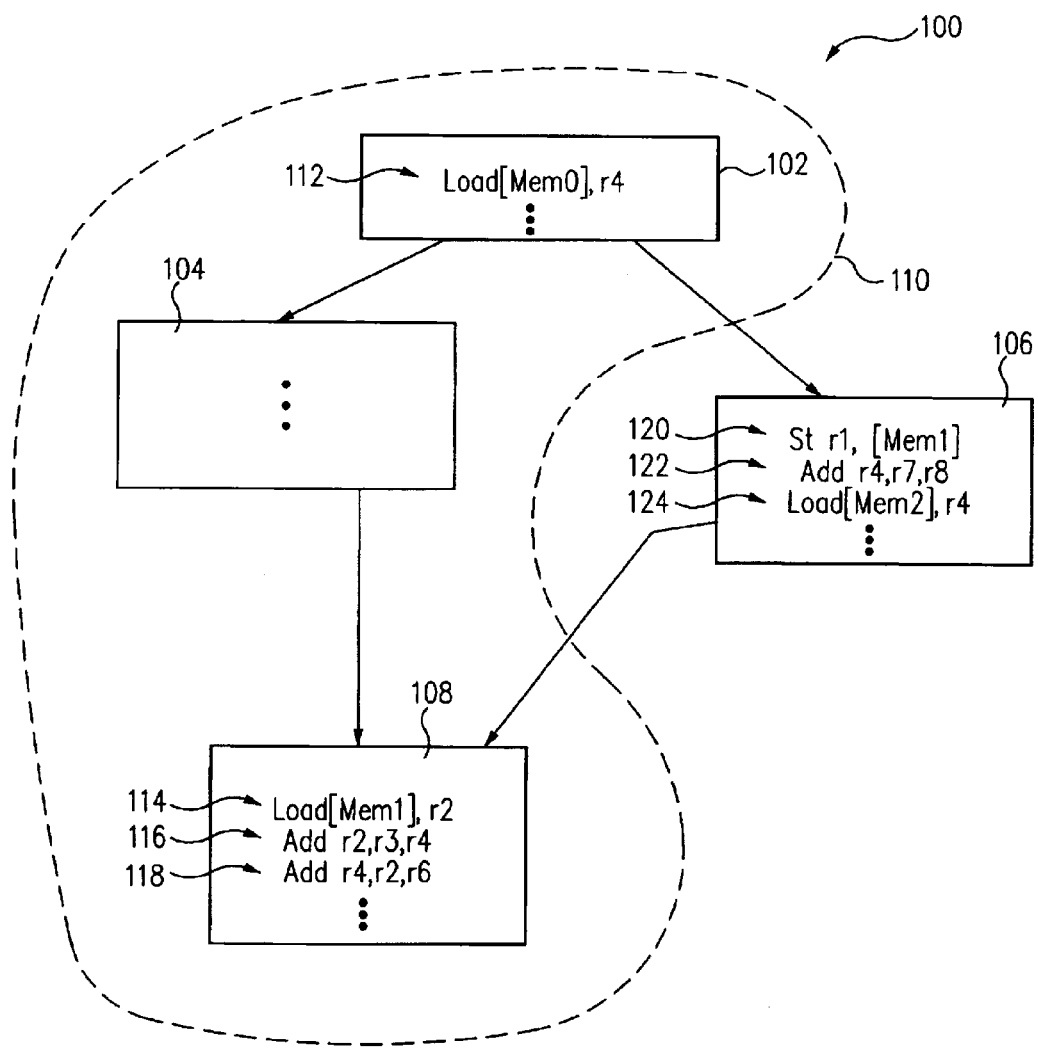
FIG. 1 is a control flow graph including a trace in accordance with the prior art.
Figure 2:
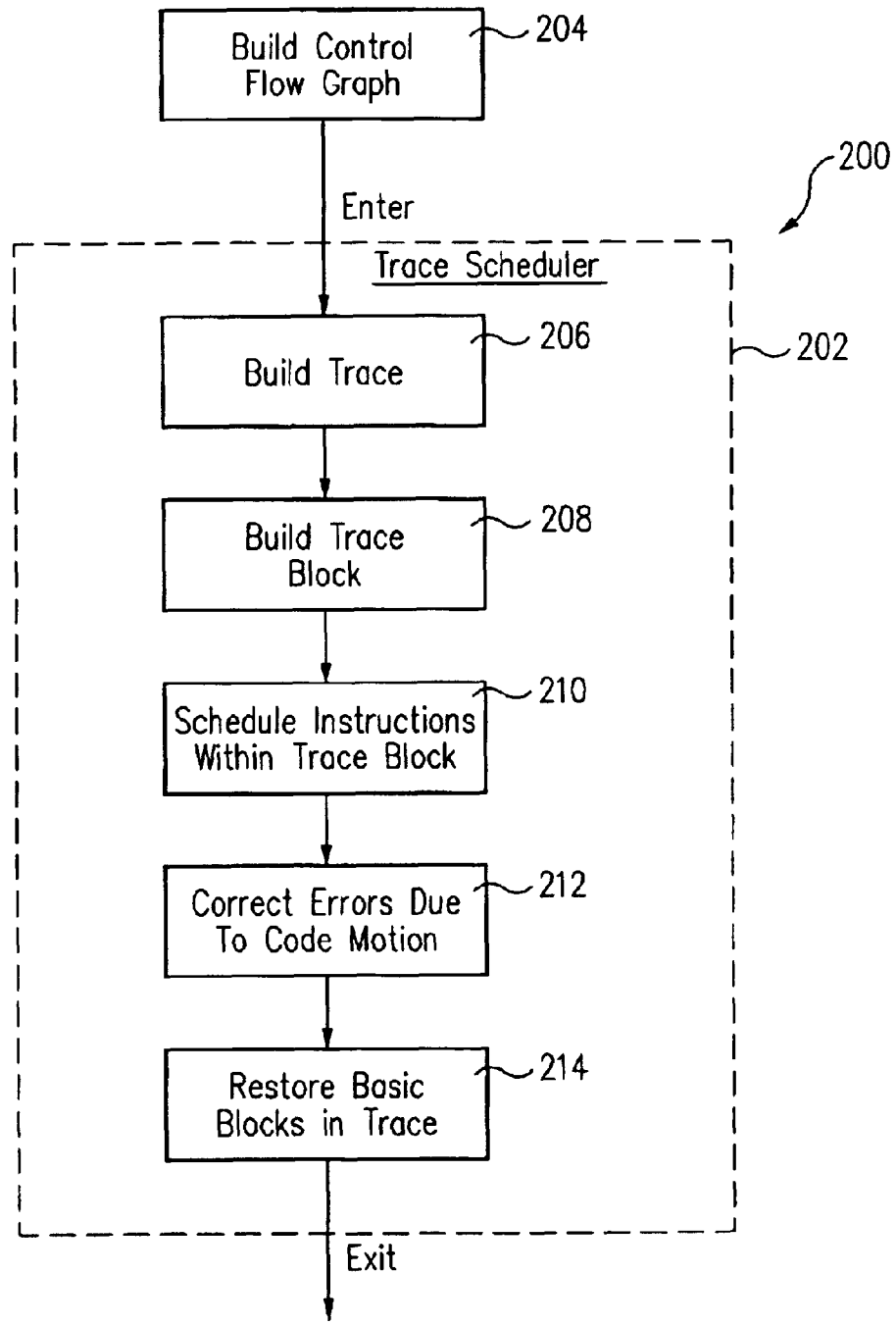
FIG. 2 is a flow chart including a trace scheduler in accordance with one embodiment of the present invention.

FIG. 2 is a flow chart 200 including a trace scheduler 202 in accordance with one embodiment of the present invention. Referring now to FIGS. 1 and 2 together, in build control flow graph operation 204, control flow graph 100 is built. Control flow graph 100 is a graph of the flow through the basic blocks, i.e., basic blocks 102, 104, 106, and 108. Control flow graph 100 is built using any one of a number of techniques well known to those of skill in the art, and the particular technique used to build control flow graph 100 is not essential to the present invention.

Control flow graph 100 includes basic blocks 102, 104, 106, and 108. As indicated by the arrows, the control flow of control flow graph 100 is from basic block 102 to basic block 108 through either basic block 104 or basic block 106.

Basic block 102 includes instruction 112, which loads the value from memory location Mem0 into register r4. Basic block 104 includes instructions, which are not illustrated to avoid detracting from the principals of the invention.

Basic block 106 includes instructions 120, 122 and 124. Instruction 120 stores the value in register r1 in memory location Mem1. Instruction 122 adds the values in registers r4 and r7 and assigns the result to register r8. Instruction 124 loads the value from memory location Mem2 into register r4.

Basic block 108 includes instructions 114, 116 and 118. Instruction 114 loads the value from memory location Mem1 into register r2. Instruction 116 adds the values in registers r2 and r3 and assigns the result to register r4. Instruction 118 adds the values in registers r4 and r2 and assigns the result to register r6.

Basic blocks 102, 106 and 108 can include instructions other than those discussed above. These other instructions are not illustrated to avoid detracting from the principals of the present invention.

After control flow graph 100 is built in build control flow graph operation 204, process flow enters trace scheduler 202 and, more particularly, moves to build trace operation 206.

In build trace operation 206, trace 110 is built. In one embodiment, trace 110 is built by linking a collection of basic blocks, i.e., basic blocks 102, 104 and 108, which have an execution frequency above a predetermined execution frequency. However, trace 110 can be built using any one of a number of techniques well known to those of skill in the art, and the particular technique used to build trace 110 is not essential to the present invention.

Trace 110 consists of basic blocks 102, 104 and 108. Trace 110 does not include basic block 106 and so basic block 106 is referred to as an off trace basic block 106.

Figure 3:
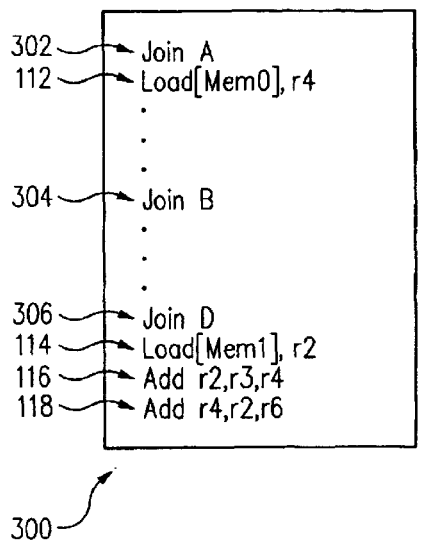
FIG. 3 is a trace block in accordance with one embodiment of the present invention.
Figure 4:
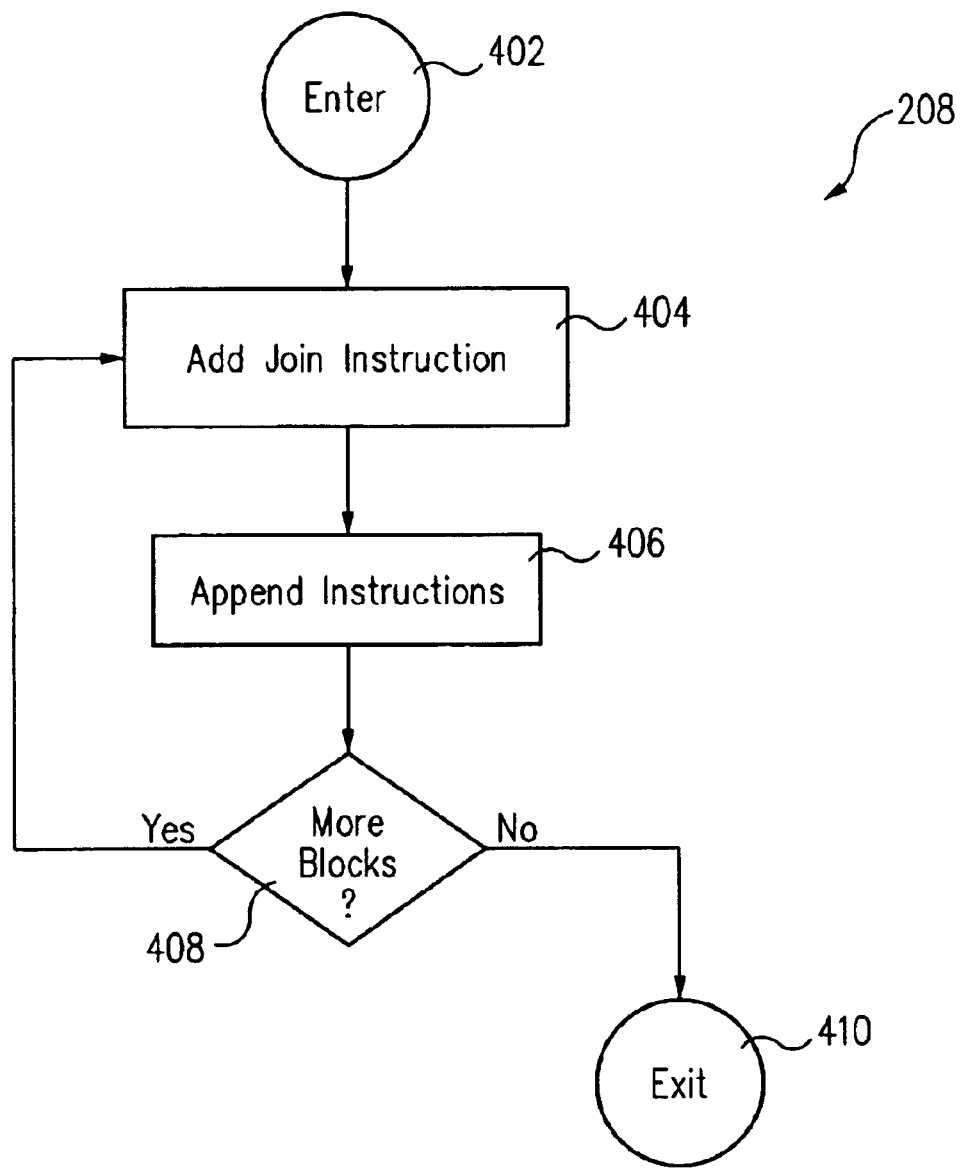
FIG. 4 is a flow chart of a build trace block operation of the flow chart of FIG. 2 in accordance with one embodiment of the present invention.

FIG. 3 is a trace block 300 in accordance with one embodiment of the present invention. FIG. 4 is a flow chart of a build trace block operation 208 of flow chart 200 of FIG. 2 in accordance with one embodiment of the present invention. Referring now to FIGS. 1, 2, 3 and 4 together, after trace 110 is built in build trace operation 206, process flow moves to build trace block operation 208. In build trace block operation 208, trace block 300 of FIG. 3 is built.

More particularly, from build trace operation 206, build trace block operation 208 is entered from an enter operation 402 (FIG. 4). For the first basic block of trace 110, i.e., basic block 102, instruction 302 is inserted into trace block 300 in add join instruction operation 404. Instruction 302 is sometimes called a first join instruction, or a join A instruction, and is hereinafter referred to as join instruction 302.

From add join instruction operation 404, in an append instructions operation 406, the instructions of the first basic block of trace 110, i.e., basic block 102, are inserted into trace block 300 following join instruction 302 and are mapped to join instruction 302. Accordingly, instruction 112 and any other instructions of basic block 102 are inserted into trace block 300 following join instruction 302 and mapped to join instruction 302.

From append instructions operation 406, a determination is made whether or not there are more basic blocks in more blocks operation 408. If a determination is made that there are no more basic blocks in more blocks operation 408, he then the process exits in exit operation 410. However, if a determination is made that there are more basic blocks in more blocks operation 408, then the process returns to add join instruction 404.

In this embodiment, a determination is made that there are more basic blocks in more blocks operation 408, e.g., that there is still basic block 104. Thus, for the following, e.g., second, basic block of trace 110, i.e., basic block 104, instruction 304 is inserted into trace block 300 following the instructions of basic block 102 in add join instruction operation 404. Instruction 304 is sometimes called a second join instruction, or a join B instruction, and is hereinafter referred to as join instruction 304.

From add join instruction operation 404, in append instructions operation 406, the instructions of the second basic block of trace 110, i.e., basic block 104, are inserted into trace block 300 following join instruction 304 and are mapped to join instruction 304.

From append instructions operation 406, a determination is made whether or not there are more basic blocks in more blocks operation 408. Operations 404, 406, and 408 are repeated until there are no more basic blocks and then the process exits in exit operation 410.

However, in this embodiment, a determination is made that there are more basic blocks in more blocks operation 408, i.e., that there is still basic block 108. Thus, the process returns to add join instruction 404. For the following, e.g., third or last, basic block of trace 110, i.e., basic block 108, instruction 306 is inserted into trace block 300 following the instructions of basic block 104 in add join instruction operation 404. Instruction 306 is sometimes called a third or last join instruction, or a join D instruction, and is hereinafter referred to as join instruction 306.

From add join instruction operation 404, in append instructions operation 406, the instructions of the last basic block of trace 110, i.e., basic block 108, are inserted into trace block 300 following join instruction 306 and mapped to join instruction 306. Accordingly, instructions 114, 116, 118 and any other instructions of basic block 108 are inserted into trace block 300 following join instruction 306 and mapped to join instruction 306.

From append instructions operation 406, a determination is made that there are no more basic blocks in more blocks operation 408. The process then exits in exit operation 410.

In the above manner, the instructions of each basic block are mapped to a specific join instruction. Further, each join instruction contains information about which instructions are contained in the particular basic block associated with the join instruction. In addition, each join instruction is a delimiter for the particular basic block associated with the join instruction, i.e., marks where the instructions of the particular basic block associated with the join instructions begin in trace block 300.

To illustrate, instruction 112 is mapped to join instruction 302, which is associated with basic block 102. Similarly, instructions 114, 116 and 118 are mapped to join instruction 306, which is associated with basic block 108. Further, join instruction 302 contains information that instruction 112 is contained in basic block 102. Similarly, join instruction 306 contains information that instructions 114, 116 and 118 are contained in basic block 108.

As set forth above, trace block 300 includes all of the instructions of trace 110, i.e., all of the instructions of basic blocks 102, 104, 108. Trace block 300 further includes join instructions 302, 304 and 306.

Figure 5:
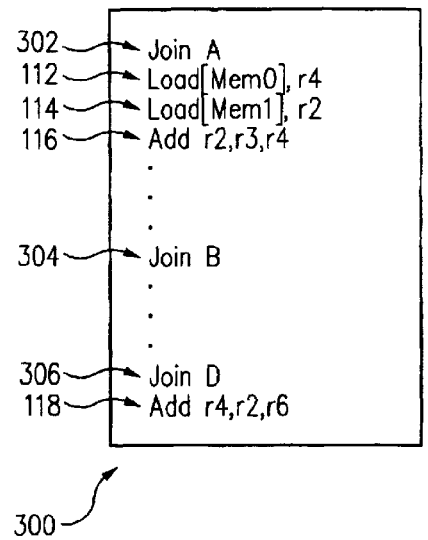
FIG. 5 is the trace block of FIG. 3 after scheduling of instructions to maximize efficiency in accordance with one embodiment of the present invention.

FIG. 5 is trace block 300 of FIG. 3 after scheduling of instructions to maximize efficiency in accordance with one embodiment of the present invention. Referring now to FIGS. 2, 3 and 5 together, from build trace block operation 208, the instructions within trace block 300 are scheduled to maximize efficiency in schedule instructions within trace block operation 210. More particularly, the instructions within trace block 300 are scheduled disregarding data dependencies from off trace basic blocks thus exposing more parallelism, more instruction motion, and maximizing efficiency.

In one embodiment, the instructions within trace block 300 are scheduled using various parameters such as the height of the instructions, the register pressure, the execution frequency of the basic blocks, and the processor resources. However, in light of this disclosure, those of skill in the art will understand that the instructions within trace block 300 can be scheduled to maximize efficiency using any one of a number of techniques, and the particular technique used is not essential to the present invention. Referring now to FIG. 5, in this embodiment, instructions 114 and 116 have been moved to immediately follow instruction 112.

Referring again to FIG. 2, from schedule instructions within trace block operation 210, process flow moves to correct errors due to a code motion operation 212. In correct errors due to code motion operation 212, corrections are made to correct errors introduced during scheduling of the instructions within trace block 300. More particularly, corrections are made to recognize the data dependencies from the off trace blocks, which were disregarded during scheduling.

Figure 7:
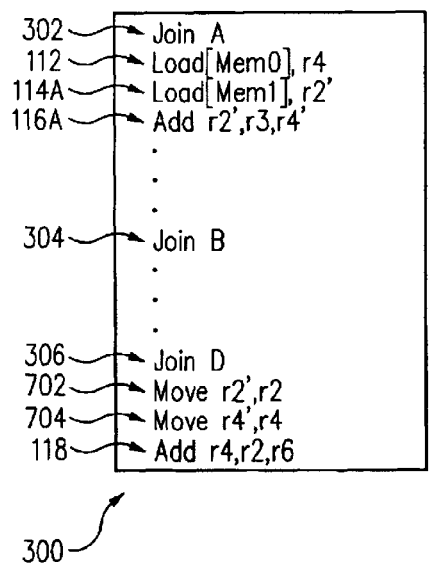
FIG. 7 is the trace block of FIG. 5 after being corrected for errors due to code motion in accordance with one embodiment of the present invention.
Figure 6:
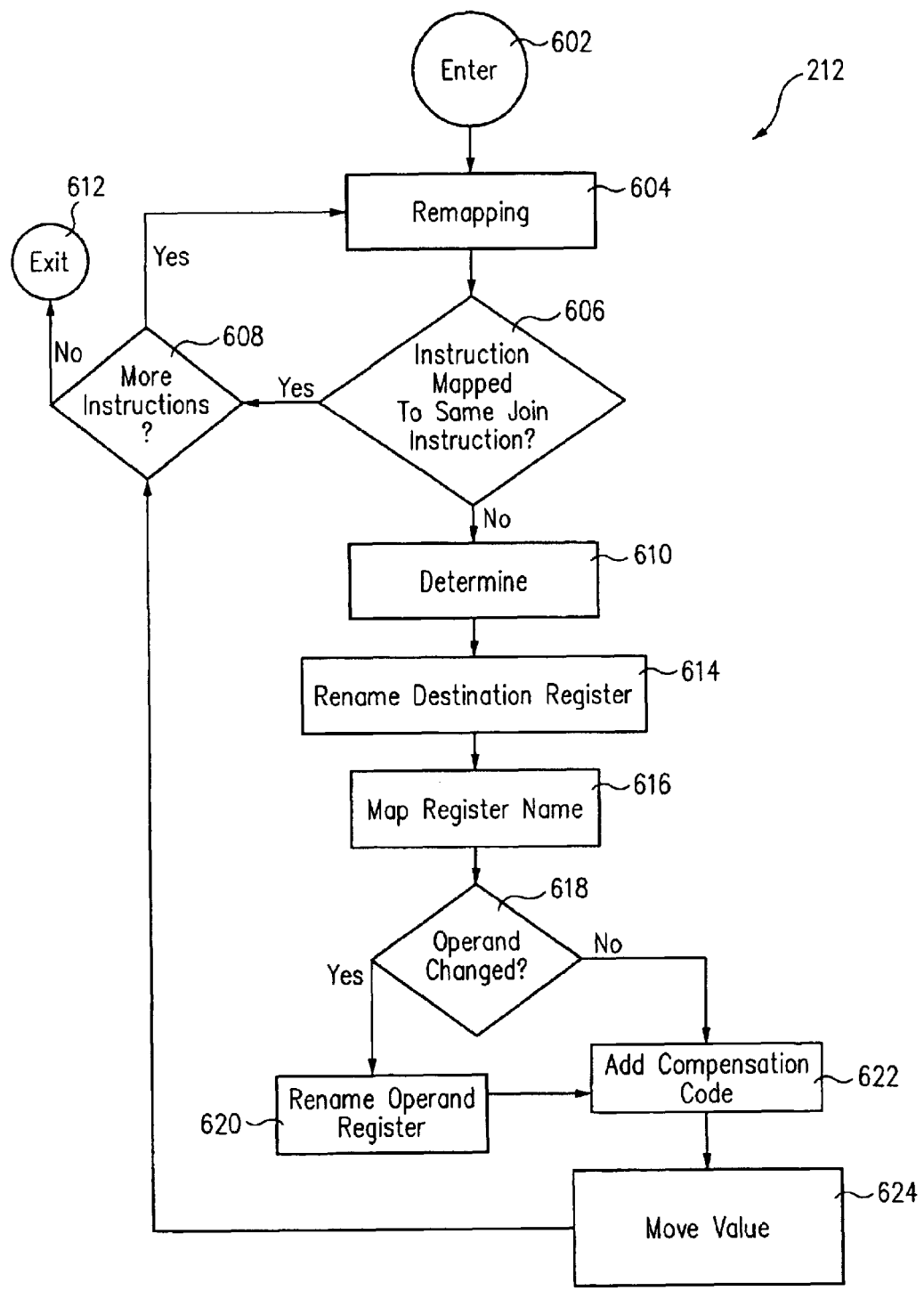
FIG. 6 is a flow chart of a correct errors due to code motion operation of the flow chart of FIG. 2 in accordance with one embodiment of the present invention.

FIG. 6 is a flow chart of correct errors due to code motion operation 212 of flow chart 200 of FIG. 2 in accordance with one embodiment of the present invention. FIG. 7 is trace block 300 of FIG. 5 after being corrected for errors due to code motion in accordance with one embodiment of the present invention.

Referring now to FIGS. 5, 6, and 7 together, from enter operation 602, process flow moves to remapping operation 604. In remapping operation 604, each instruction of trace block 300 is mapped to the preceding join instruction. To illustrate, referring now to FIG. 5, instruction 112 is mapped to join instruction 302.

From remapping operation 604, in instruction mapped to same join instruction operation 606, a determination is made whether the instruction is mapped to the same join instruction as before the instructions were scheduled within the trace block. If the instruction is mapped to the same join instruction, then process flow moves to more instructions operation 608. However, if the instruction is not mapped to the same join instruction, then process flow moves to determine operation 610.

In this embodiment, instruction 112 was mapped to join instruction 302 before the instructions were scheduled within trace block 300 as illustrated in FIG. 3. Since instruction 112 is mapped to join instruction 302 after the instructions were scheduled within trace block 300 as illustrated in FIG. 5, instruction 112 is mapped to the same join instruction, i.e., join instruction 302, as before the instructions were scheduled within trace block 110. Thus, process flow moves from instruction mapped to same join instruction operation 606 to more instructions operation 608.

In more instructions operation 608, a determination is made as to whether or not there are more instructions in the trace block. If there are no more instructions in the trace block, then process flow exits in an exit operation 612. However, if there are more instructions in the trace block, then process flow returns to remapping operation 604 for the next instruction.

In one embodiment, instead of mapping each instruction of trace block 300 to the preceding join instruction and then proceeding to instruction mapped to same join instruction operation 606, all of the instructions of trace block 300 are mapped to the preceding join instruction at one time in remapping operation 604. In accordance with this embodiment, if a determination is made in more instructions operation 608 that there are more instructions, then process flow moves directly back to instruction mapped to same join instruction operation 606 for the next instruction.

In this embodiment, a determination is made in more instructions operation 608 that there are more instructions in trace block 300, e.g., that instruction 114 is within trace block 300. Accordingly, process flow moves to remapping operation 604.

In remapping operation 604, instruction 114 is mapped to join instruction 302. In instruction mapped to same join instruction operation 606, a determination is made that instruction 114 is not mapped to the same join instruction as before the instructions were scheduled within trace block 300.

More particularly, instruction 114 was mapped to join instruction 306 before the instructions were scheduled within trace block 300 as illustrated in FIG. 3. However, instruction 114 is mapped to join instruction 302 after the instructions were scheduled within trace block 300 as illustrated in FIG. 5 and discussed above.

Since instruction 114 is not mapped to the same join instruction as before the instructions were scheduled within trace block 300, process flow moves to determine operation 610. In determine operation 610, the destination and home blocks of the instruction are determined. The home block is the basic block in which the instruction was mapped before scheduling. Conversely, the destination block is the basic block in which the instruction is mapped after scheduling. Stated another way, the instruction moves from the home block to the destination block during scheduling of the instructions within the trace block.

In this embodiment, instruction 114 was mapped to join instruction 306 before the instructions were scheduled and mapped to join instruction 302 after the instructions were scheduled. As discussed above, join instruction 306 is associated with basic block 108 and join instruction 302 is associated with basic block 102 (FIG. 1). Accordingly, a determination is made that basic block 108 is the home block and that basic block 102 is the destination block in determine operation 610.

From determine operation 610, in a rename destination register operation 614, the destination register, sometimes called the written register, of the instruction is renamed in the destination block. The destination register is the register which is written to during execution of the instruction. In this embodiment, register r2 of instruction 112 is the destination register. Register r2 is renamed as register r2', as shown in FIG. 7.

From rename destination register operation 614, in a map register name operation 616, the old register name is mapped to the new register name. The old register name is the destination register's name before rename destination register operation 614. The new register name is the destination register's name after rename destination register operation 614.

Figure 8:
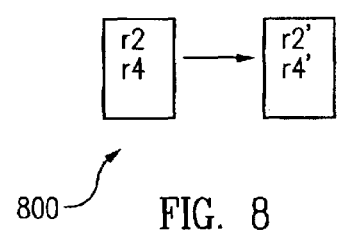
FIG. 8 is a block diagram illustrating the mapping of old register names to new register names in accordance with one embodiment of the present invention.

FIG. 8 is a block diagram 800 illustrating the mapping of old register names to new register names in accordance with one embodiment of the present invention. In this embodiment, the old register name r2 is mapped to the new register name r2'.

From map register name operation 616, in an operand changed operation 618, a determination is made as to whether or not an operand register name of the instruction has changed. The operand register name of the instruction is the register name of the register which is used or read by the instruction during execution. If the operand register name of the instruction has changed, then process flow moves to rename operand register operation 620. However, if the operand register name of the instruction has not changed or if the instruction does not contain an operand register name, then process flow moves to add compensation code operation 622.

In this embodiment, instruction 114 loads a value from memory and does not contain an operand register. Since there is no operand register, and thus there is no operand register name which has changed, process flow moves to add compensation code operation 622. In add compensation code operation 622, compensation code is added to the off trace block (or off trace block flow) as discussed further below.

From add compensation code operation 622, in a move value operation 624, a move instruction is inserted into the home block of the instruction. The move instruction moves the value in the new register, i.e., the register which has the new register name, to the old register, i.e., the register which has the old register name. This assures that the old register, which may be used by subsequent instructions, contains the correct value.

In this embodiment, instruction 702, hereinafter referred to as move instruction 702, is added after join instruction 306. Move instruction 702 moves the value in register r2', i.e., the new register, to register r2, i.e., the old register. From move value instruction 624, process flow moves to more instructions operation 608, which was discussed above.

Referring again to FIGS. 5, 6 and 7 together, in this embodiment, a determination is made in more instructions operation 608 that there are more instructions in trace block 300, e.g., that instruction 116 is within trace block 300. Accordingly, process flow moves to remapping operation 604.

In remapping operation 604, instruction 116 is mapped to join instruction 302. In instruction mapped to same join instruction operation 606, a determination is made that instruction 116 is not mapped to the same join instruction as before the instructions were scheduled within trace block 300.

More particularly, instruction 116 was mapped to join instruction 306 before the instructions were scheduled within trace block 300 as illustrated in FIG. 3. However, instruction 116 is mapped to join instruction 302 after the instructions were scheduled within trace block 300 as illustrated in FIG. 5 and discussed above.

Since instruction 116 is not mapped to the same join instruction as before the instructions were scheduled within trace block 300, process flow moves to determine operation 610.

In this embodiment, instruction 116 was mapped to join instruction 306 before the instructions were scheduled and mapped to join instruction 302 after the instructions were scheduled. As discussed above, join instruction 306 is associated with basic block 108 and join instruction 302 is associated with basic block 102 (FIG. 1). Accordingly, a determination is made that basic block 108 is the home block and that basic block 102 is the destination block in determine operation 610.

From determine operation 610, in rename destination register operation 614, the destination register r4 of instruction 116 is renamed as register r4', as shown in FIG. 7.

From rename destination register operation 614, in map register name operation 616, the old register r4 is mapped to the new register r4' as shown in FIG. 8.

From map register name operation 616, in operand changed operation 618, a determination is made as to whether or not an operand register name of instruction 116 has changed. In this embodiment, instruction 116 has two operand registers, i.e., register r2 and register r3. Since register r2 has changed to register r2', a determination is made in operand changed operation 618 that an operand register name has changed. Thus, process flow moves to rename operand register operation 620.

In rename operand register operation 620, the new register name is used for the operand register which has changed. In this embodiment, register r2 is renamed as register r2', as shown in FIG. 7.

From rename operand register operation 620, process flow moves to add compensation code operation 622 and compensation code is added to the off trace block (or off trace block flow) as discussed further below.

From add compensation code operation 622, in move value operation 624, instruction 704, hereinafter referred to as move instruction 704, is added after join instruction 306. Move instruction 704 moves the value in register r4', i.e., the new register, to register r4, i.e., the old register.

From move value instruction 624, process flow moves to more instructions operation 608, which was discussed above. Process flow then moves through operations 604, 606 and 608 until a determination is made in more instructions operation 608 that there are no more operations, and thus exits at exit operation 612.

Referring again to FIG. 2, from correct errors due to code motion operation 212, process flow moves to restore basic blocks in trace operation 214. In restore basic blocks in trace operation 214, the instructions are moved, sometimes called restored, from the trace block back into the basic blocks.

Figure 9:
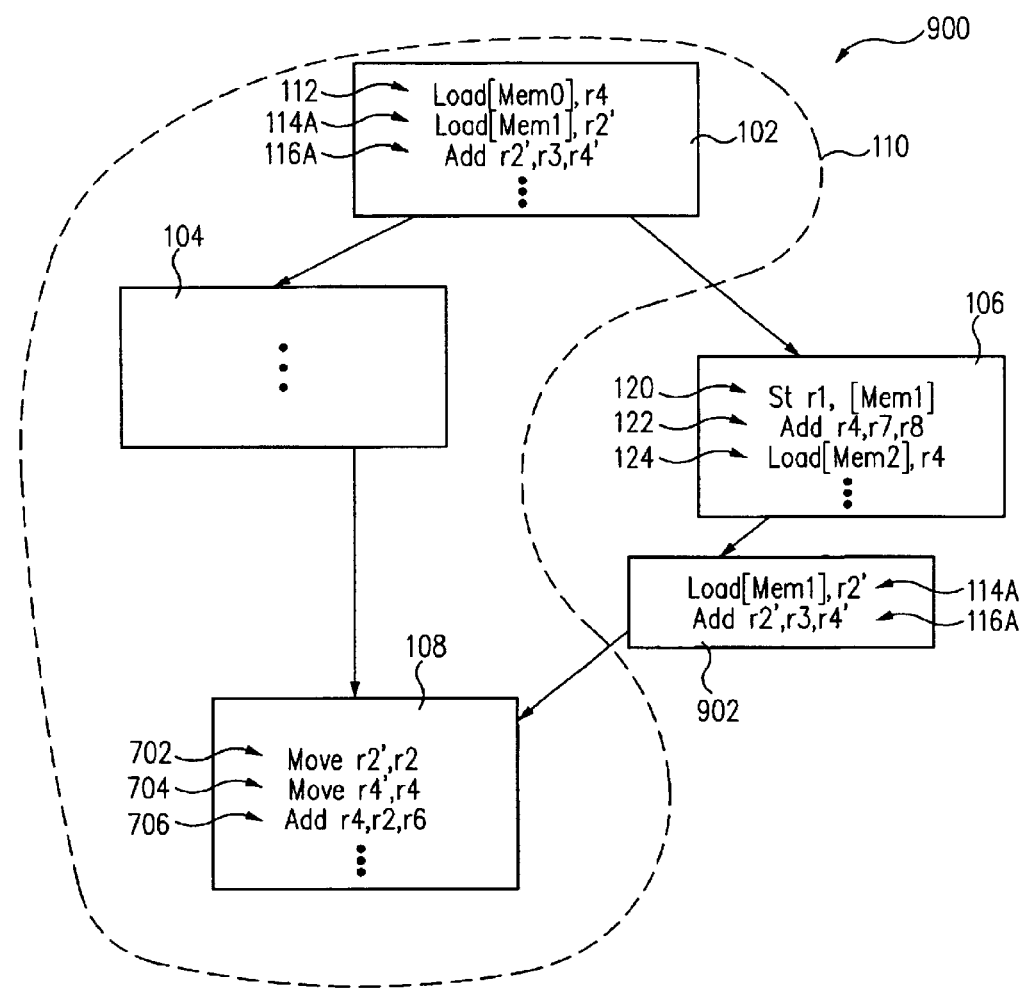
FIG. 9 is a control flow graph in accordance with one embodiment of the present invention.
Figure 10:
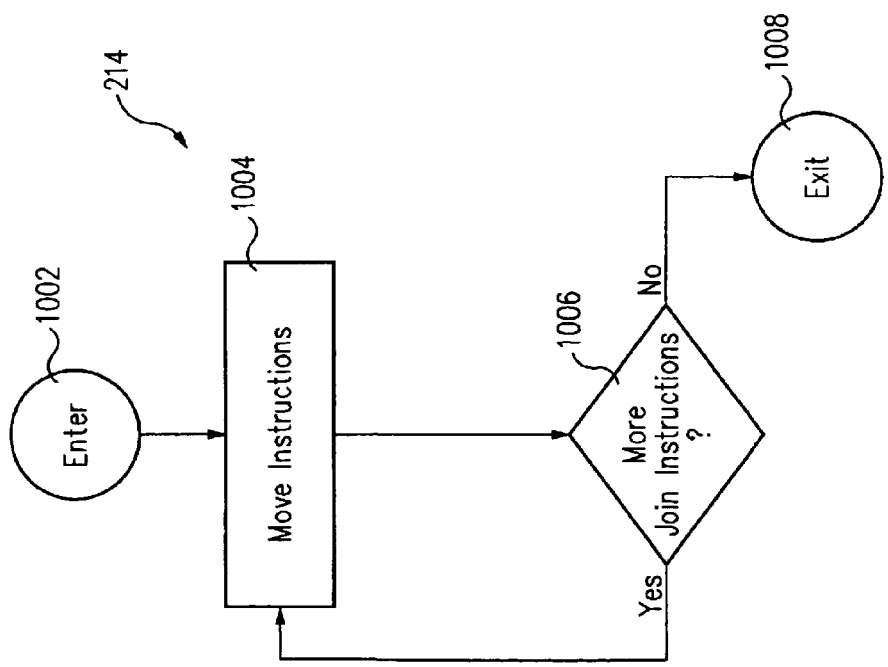
FIG. 10 is a flow chart of a restore basic blocks in trace operation of the flow chart of FIG. 2 in accordance with one embodiment of the present invention.

FIG. 9 is a control flow graph 900 in accordance with one embodiment of the present invention. FIG. 10 is a flow chart of restore basic blocks in trace operation 214 of flow chart 200 of FIG. 2 in accordance with one embodiment of the present invention.

Referring now to FIGS. 7, 9 and 10 together, from an enter operation 1002, process flow moves to a move instructions operation 1004. For the first join instruction, all of the instructions following the first join instruction (and preceding the following join instruction if one exists) are moved to the basic block associated with the first join instruction.

In this embodiment, the first join instruction is join instruction 302. The following join instruction is join instruction 304. Instructions 112, 114A, and 116A follow join instruction 302 and precede join instruction 304. As discussed above, join instruction 302 is associated with basic block 102. Thus, instructions 112, 114A, and 116A are moved into basic block 102 as shown in FIG. 9.

From move instructions operation 1004, in a more join instructions operation 1006, a determination is made as to whether or not there are more join instructions in the trace block. If there are more join instructions, process flow returns to move instructions operation 1004 and the following join instruction becomes the present join instruction. However, if there are no more join instructions, i.e., the present join instruction is the last join instruction, process flow moves to exit operation 1008.

In this embodiment, a determination is made in more join instructions operation 1006 that there are more join instructions in trace block 300, e.g., that join instruction 304 is within trace block 300. Accordingly, join instruction 304 becomes the present join instruction and process flow returns to move instructions operation 1004.

The present join instruction is now join instruction 304. The following join instruction is now join instruction 306. As discussed above, join instruction 304 is associated with basic block 104. Any instructions which follow join instruction 304 and precede join instruction 306 are moved to basic block 104.

From move instructions operation 1004, in more join instructions operation 1006, a determination is made that there are more join instructions in trace block 300, e.g., that join instruction 306 is within trace block 300. Accordingly, process flow returns to move instructions operation 1004.

The present join instruction is now join instruction 306, which is the last join instruction. As discussed above, join instruction 306 is associated with basic block 108. Move instructions 702, 704 and instruction 118 follow join instruction 306 and are moved to basic block 108 as shown in FIG. 9.

As discussed above, the move instructions, i.e., move instructions 702, 704, are inserted into trace block 300 in move value operation 624 (FIG. 6) and then moved into the basic block, i.e., basic block 108, associated with the join instruction in move instructions operation 1004. However, in an alternative embodiment, the move instructions are inserted directly into the basic block associated with the join instruction in move value operation 624.

Further, in one embodiment, prior to instruction mapped to same join instruction operation 606, a determination is made whether the instruction is a move instruction. If so, process flow moves directly to more instructions operation 608. In this manner, move instructions are passed over and operations are performed on the next instruction. However, other techniques are used in other embodiments to pass over move instructions.

From move instructions operation 1004, in more join instructions operation 1006, a determination is made that there are no more join instructions in trace block 300. Accordingly, process flow exits at exit operation 1008.

Referring again to FIG. 6, as discussed above, the home block and the destination block of the instruction is determined in determine operation 610. Process flow then moves through operations 614, 616, 618 and sometimes through rename operand register operation 620 to add compensation code operation 622.

Figure 11:
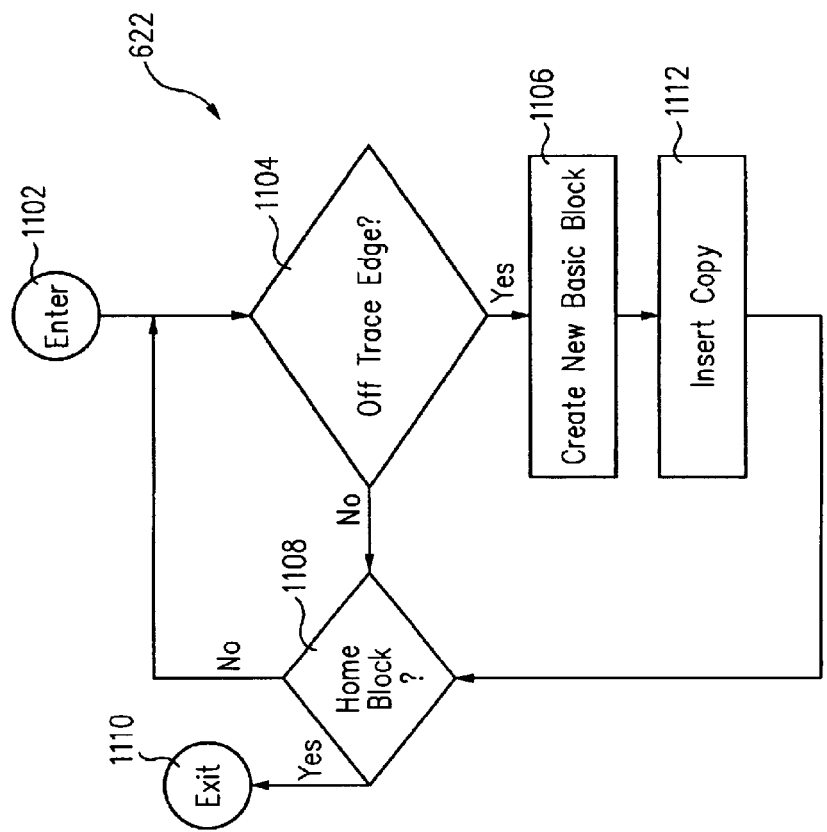
FIG. 11 is a flow chart of an add compensation code operation of the flow chart of FIG. 6 in accordance with one embodiment of the present invention.

FIG. 11 is a flow chart of add compensation code operation 622 of the flow chart of FIG. 6 in accordance with one embodiment of the present invention. In this illustration, instruction 114 (FIG. 5) is the present instruction being operated upon. As discussed above, the destination block of instruction 114 is basic block 102 and the home block of instruction 114 is basic block 108. Further, after rename destination register operation 614, instruction 114 has been modified to instruction 114A has shown in FIG. 9. Instruction 114A and sometimes called a moved register renamed instruction. The region of trace 110 between the destination block and the home block of the instruction is analyzed as discussed below to determine if compensation code is necessary.

Beginning with the successor block to the destination block, i.e., basic block 104 which is the first target basic block, from an enter operation 1102 (FIG. 11), process flow moves to an off trace edge operation 1104.

In off trace edge operation 1104, a determination is made for the target basic block whether there is an incoming edge from an off trace basic block. If there is an incoming edge from an off trace basic block, process flow moves to create new basic block operation 1106. However, if there is not an incoming edge from an off trace basic block, process flow moves to home block operation 1108.

In this embodiment, there is no incoming edge from an off trace basic block coming into basic block 104. Accordingly, in off trace edge operation 1104, a determination is made that there is not an incoming edge from an off trace basic block and process flow moves again to home block operation 1108.

Basic block 104 is not the home block of instruction 114. Thus, a determination is made that the target basic block is not the home block of the instruction in home block operation 1108. Accordingly, process flow returns to off trace edge operation 1104.

The next basic block becomes the target basic block. In this embodiment, basic block 108 becomes the target basic block. As shown in FIG. 9, there is an incoming edge from off trace basic block 106 coming into basic block 108. Accordingly, in off trace edge operation 1104, a determination is made that there is an incoming edge from an off trace basic block. Thus, process flow moves to create new basic block operation 1106.

In create new basic block operation 1106, a new basic block is created between the off trace basic block and the target basic block, unless a basic block has already been created previously in create new basic block operation 1106. In this embodiment, a new basic block 902 is created between off trace basic block 106 and basic block 108, i.e., the target block. Basic block 902 is hereinafter referred to as a compensation basic block.

From create new basic block operation 1106, process flow moves to insert copy operation 1112. A copy of the moved register renamed instruction is inserted into the compensation basic block in insert copy operation 1112.

In this embodiment, the moved register renamed instruction is instruction 114A. Thus, a copy of instruction 114A is inserted into compensation basic block 902 as shown in FIG. 9. From insert copy operation 1112, process flow moves to home block operation 1108. Operations 1104, 1106, 1112, and 1108 are repeated until a determination is made in home block operation 1108 that the target basic block is the home block, and the process flow exits at exit operation 1110. As should be readily apparent, instruction 116A is inserted into compensation basic block 902 for reasons similar to those discussed above with regards to instruction 114A.

Referring now to FIG. 9, by adding compensation basic block 902 containing instructions 114A, 116A, the correct values are placed in registers r2', r4', even if process flow moves in the off trace path through off trace basic block 106.

Figure 12:
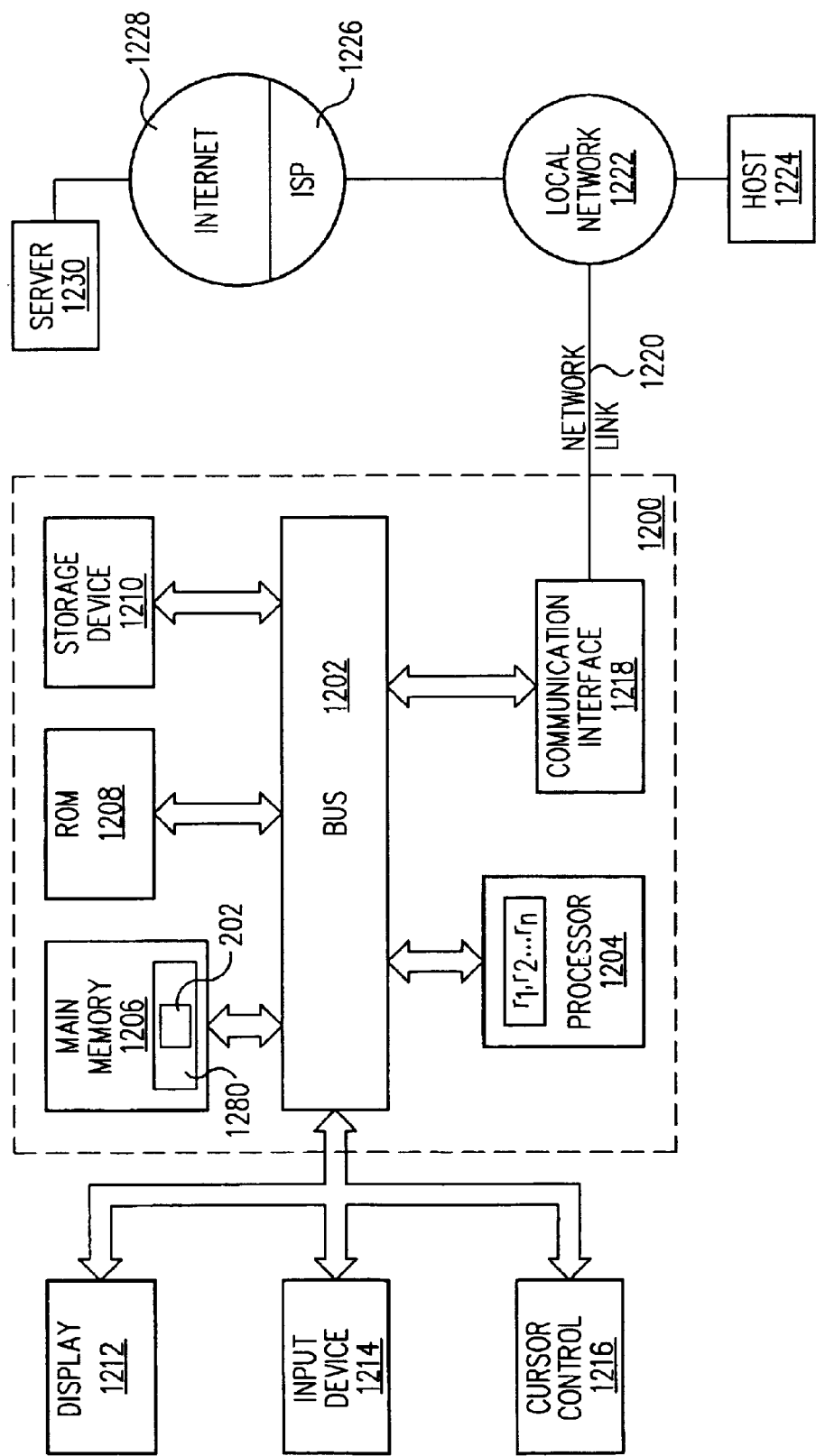
FIG. 12 is a block diagram which illustrates a computer system upon which an embodiment in accordance with the present invention may be implemented.

FIG. 12 is a block diagram which illustrates a computer system 1200 upon which an embodiment in accordance with the present invention may be implemented. Computer system 1200 includes a bus 1202 or other communication mechanism for communicating information, and a processor 1204 coupled with bus 1202 for processing information. Processor 1204 contains registers r1, r2, . . . rn as indicated.

Computer system 1200 also includes a main memory 1206, such as a random access memory (RAM) or other dynamic storage device, coupled to bus 1202 for storing information and instructions to be executed by processor 1204. In one embodiment, main memory 1206 has stored therein a compiler 1280 including a trace scheduler 202 in accordance with the present invention. Main memory 1206 also may be used for storing temporary variables or other intermediate information during to execution of instructions by processor 1204.

Computer system 1200 also includes a read only memory (ROM) 1208 or other static storage device coupled to bus 1202 for storing static information and instructions for processor 1204. A storage device 1210, such as a magnetic disk or optical disk, is also provide and coupled to bus 1202 for storing information and instructions.

Computer system 1200 may also be coupled via bus 1202 to a display 1212, such as a cathode ray tube (CRT), for displaying information to a computer user. An input device 1214, including alphanumeric and other keys, is also provided and coupled to bus 1202 for communicating information and command selections to processor 1204.

Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x or horizontal) and a second axis (e.g., y or vertical), which allows the device to specify positions in a plane.

Computer system 1200 is used to schedule instructions using a trace scheduler in accordance with various embodiments of the present invention. According to one embodiment, the scheduling of instructions using a trace scheduler is provided by computer system 1200 in response to processor 1204 executing sequences of instructions contained in main memory 1206.

Such instructions may be read into main memory 1206 from another computer-readable medium, such as storage device 1210. However, the computer-readable medium, sometimes called a computer program product, is not limited to devices such as storage device 1210. For example, the computer-readable medium may include a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer is capable of reading. Execution of the sequences of instructions contained in main memory 1206 causes processor 1204 to perform the operations previously described. In alternative embodiments, hard-wired circuitry may be used in place of or in combination with software instructions. Thus, embodiments in accordance with the present invention are not limited to any specific combination of hardware circuitry and software.

Computer 1200 also includes a communication interface 1218 coupled to bus 1202. Communication interface 1218 provides a two-way data communication coupling to a network link 1220 to a local network 1222.

For example, if communication interface 1218 is an integrated services digital network (ISDN) card or a modem, communication interface 1218 provides a data communication connection to the corresponding type of telephone line.

If communication interface 1218 is a local area network (LAN) card, communication interface 1218 provides a data communication connection to a compatible LAN. Wireless links are also possible. In any such implementation, communication interface 1218 sends and receives electrical, electromagnetic or optical signals which carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226.

ISP 1226 in turn provides data communication services through the world wide packet data communication network now commonly referred to as the "Internet" 1228. Local network 1222 and Internet 1228 both use electrical, electromagnetic or optical signals which carry digital data streams. The signals through the various networks and the signals on network link 1220 and through communication interface 1218, which carry the digital data to and from computer 1200 are exemplary forms of carrier waves transporting the information.

Computer 1200 is capable of sending messages and receiving data, including program code, through the network(s), network link 1220 and communication interface 1218. In the Internet example, a server 1230 might transmit a requested code for an application program through Internet 1228, ISP 1226, local network 1222 and communication interface 1218. In accordance with one embodiment of the present invention, one such downloaded application provides for the scheduling of instructions using a trace scheduler as described herein.

The received code may be executed by processor 1204 as it is received, and/or stored in storage device 1210, or other non-volatile storage for later execution. In this manner, computer 1200 may obtain application code in the form of a carrier wave.

The embodiments described herein may be employed as part of a computer language compiler or as a stand alone process for scheduling of instructions using a trace scheduler.

While the invention has been shown with reference to particular embodiments thereof, it will be understood by those skilled in the art that various other changes in the form and details may be made therein without departing from the spirit and scope of the invention.

What is claimed is:

1. A method comprising:
   building a trace comprising instructions;
   building a trace block comprising said instructions;
   scheduling said instructions within said trace block disregarding data dependencies from any off trace basic blocks, wherein at least one of said instructions is moved during said scheduling; and
   correcting errors due to said at least one of said instructions being moved.

2. The method of claim 1 wherein said trace comprises basic blocks comprising said instructions.

3. The method of claim 2 wherein said building a trace block comprises:
   adding join instructions associated with said basic blocks to said trace block;
   appending said instructions into said trace block; and
   mapping said instructions to said join instructions.

4. The method of claim 3 wherein said correcting errors comprises remapping said instructions to said join instructions after said scheduling.

5. The method of claim 4 wherein said correcting errors further comprises determining whether said instructions are mapped to the same join instructions of said join instructions after said scheduling as before said scheduling.

6. The method of claim 1 wherein said correcting errors comprises renaming registers of said instructions.

7. The method of claim 6 further comprising moving values from registers having new names to registers having old names.

8. The method of claim 1 wherein said correcting errors comprises adding compensation code.

9. A method comprising:
   building a trace comprising a first basic block and a second basic block, said first basic block comprising a first instruction, said second basic block comprising a second instruction;
   building a trace block comprising said first instruction and said second instruction;
   scheduling said first instruction and said second instruction within said trace block disregarding data dependencies from off trace basic blocks, wherein said second instruction is moved from said second basic block to said first basic block during said scheduling; and
   correcting errors due to said second instruction being moved.

10. The method of claim 9 wherein said correcting errors comprises renaming a register of said second instruction.

11. The method of claim 10 wherein said register is renamed from an old name to a new name during said renaming.

12. The method the claim 11 wherein said correcting errors comprises inserting a move instruction into said second basic block to move a value in a register having said new name into a register having said old name.

13. The method of claim 9 further comprising building a control flow graph comprising said trace, said control flow graph further comprising an off trace basic block having an edge coming into said second basic block.

14. The method of claim 13 wherein said correcting errors comprises adding a compensation basic block between said off trace basic block and said second basic block.

15. The method of claim 14 further comprising inserting a copy of said second instruction after said renaming into said compensation basic block.

16. A system comprising:
    a processor; and
    a memory having a method of scheduling instructions using a trace scheduler stored therein, wherein upon execution of said method, said method comprises:
    building a trace comprising said instructions;
    building a trace block comprising said instructions;
    scheduling said instructions within said trace block disregarding data dependencies from any off trace basic blocks, wherein at least one of said instructions is moved during said scheduling; and
    correcting errors due to said at least one of said instructions being moved.

17. The system of claim 16 wherein said trace comprises basic blocks comprising said instructions.

18. The system of claim 17 wherein said building a trace block comprises:
    adding join instructions associated with said basic blocks to said trace block;
    appending said instructions into said trace block; and
    mapping said instructions to said join instructions.

19. The system of claim 18 wherein said correcting errors comprises remapping said instructions to said join instructions after said scheduling.

20. The system of claim 19 wherein said correcting errors further comprises determining whether said instructions are mapped to the same join instructions of said join instructions after said scheduling as before said scheduling.

21. The system of claim 16 wherein said correcting errors comprises renaming registers of said instructions.

22. The system of claim 21 further comprising moving values from registers having new names to registers having old names.

23. The system of claim 16 wherein said correcting errors comprises adding compensation code.

24. A computer system comprising:
    means for building a trace comprising instructions;
    means for building a trace block comprising said instructions;
    means for scheduling said instructions within said trace block disregarding data dependencies from any off trace basic blocks, wherein at least one of said instructions is moved during said scheduling; and
    means for correcting errors due to said at least one of said instructions being moved.

25. A computer program product having a method of scheduling instructions using a trace scheduler stored therein, wherein upon execution of said method, said method comprises:
    building a trace comprising said instructions;
    building a trace block comprising said instructions;
    scheduling said instructions within said trace block disregarding data dependencies from any off trace basic blocks, wherein at least one of said instructions is moved during said scheduling; and
    correcting errors due to said at least one of said instructions being moved.

26. The computer program product of claim 25 wherein said trace comprises basic blocks comprising said instructions.

27. The computer program product of claim 26 wherein said building a trace block comprises:
    adding join instructions associated with said basic blocks to said trace block;

appending said instructions into said trace block; and mapping said instructions to said join instructions.

28. The computer program product of claim 27 wherein said correcting errors comprises remapping said instructions to said join instructions after said scheduling.

29. The computer program product of claim 28 wherein said correcting errors further comprises determining whether said instructions are mapped to the same join instructions of said join instructions after said scheduling as before said scheduling.

30. The computer program product of claim 25 wherein said correcting errors comprises renaming registers of said instructions.

31. The computer program product of claim 30 further comprising moving values from registers having new names to registers having old names.

32. The computer program product of claim 25 wherein said correcting errors comprises adding compensation code.

* * * * *